United States Patent Office 2,731,479
Patented Jan. 17, 1956

2,731,479
11-OXYGENATED 17α-VINYLTESTOSTERONE AND PROCESS

Charles W. Marshall, Chicago, Ill., assignor to G. D. Searle & Co., Chicago, Ill., a corporation of Illinois No Drawing. Application January 26, 1953, Serial No. 333,343

5 Claims. (Cl. 260—397.45)

This invention relates to 17 - hydroxy - 17 - vinyl-cyclopentanopolyhydrophenanthrenes and processes for the manufacture thereof. In particular, it relates to compounds of the formula

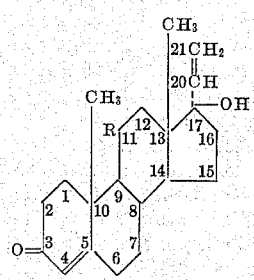

wherein R may be oxo, as in 11-oxo-17α-vinyltestosterone, or it may be hydroxyl, as in 3-oxo-17α-pregna-4,20-diene-11,17-diol.

The compounds of this invention are useful chemotherapueutic agents, being of particular value as pituitary gonadotrophic stimulants and testosterone antagonists.

Still further contributing to the utility of the subject compositions is the fact that they afford means to the syntheses of cortisone and compound "F" epimers. Thus, 11-oxo-17-α-vinyltestosterone, one of the compounds of this invention, may be converted in one step to 17-isocortisone by oxidation of the vinyl group with hydrogen peroxide in the presence of catalytic amounts of osmium tetroxide, using tert-butanol as the solvent, and temperatures in the range of 15° to 30° centigrade for 10 to 24 hours. Similarly, 11-β-hydroxy-17-α-vinyltestosterone may be converted in one step to 17-isohydrocortisone. The reactions may be graphically represented as follows:

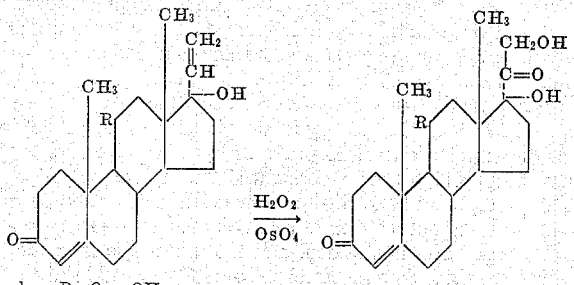

Both products are isolable by chromatographic techniques. Since experience has shown that the therapeutic benefits of cortical and other hormones are oftimes markedly enhanced by modifications of their chemical structure in such ways as to augment particular activities or otherwise better adapt them to specific glandular dysfunctions, the subject 17-transformation products are especially valuable.

Compounds of this invention may be prepared starting with either adrenosterone or 11-hydroxyandrostenedione, depending on whether the 11-oxo or 11-hydroxy product is desired, respectively. The procedure is substantially the same in either case, and may be outlined as follows: The 3-enol ethyl ether is formed by interaction of the starting steroid with ethyl orthoformate, p-toluenesulfonic acid and absolute ethanol, using dioxane as the reaction medium. Condensation with acetylene is next effected, the enol ether in a mixture of solvents—for example, benzene or toluene and dioxane, tetrahydrofuran or diethyl ether—being reacted with the gas by bubbling same therethrough in the presence of potassium tert-butoxide or tert-amoxide dissolved in tert-butyl or tert-amyl alcohol, for periods of 3 to 6 hours at a temperature in the range of 0° to 50° C. Alternatively the condensation with acetylene can be conducted, especially on large scale preparations, by use of powdered potassium hydroxide. The active powdered potassium hydroxide complex may be prepared by suspending potassium hydroxide pellets in an inert high boiling liquid such as diethyleneglycol diethyl ether, heating the mixture to about 150° C. with vigorous stirring, during which time the soluble complex forms, and cooling the mixture during good agitation. Then acetylene is passed in until the theoretical weight of acetylene to form potassium acetylide is absorbed and the steroid ketone in suitable solvent such as diethylenglycol diethyl ether or dioxane is poured in and the mixture stirred for 6 to 12 hours. The mixture is then poured in a large volume of water and crude product filtered off. The 17-ethynyl derivative so obtained is hydrolyzed to the corresponding 3-oxo compound by treatment with a dilute alcohol-and-water solution of hydrochloric acid, or the equivalent; and finally, the partial reduction of the ethynyl bond is accomplished by catalytic hydrogenation in a solvent such as dioxane, using about one atmosphere of hydrogen, and palladium on calcium carbonate as a catalyst, with a small amount of pyridine present to selectively slow the hydrogenation procedure.

The following examples will illustrate in detail certain of the processes and products of this invention. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.). Amounts of materials are given in grams (g.), milligrams (mg.) and milliliters (ml.). Percentages (%) are expressed in weight by volume.

EXAMPLE 1

A. *3-ethoxy-3,5-androstadiene-11,17-dione.*—To 3 g. of adrenosterone suspended in 15 ml. of purified dioxane is successively added, under a nitrogen atmosphere, 3 ml. of freshly distilled ethyl orthoformate, 0.4 ml. of a 9% solution of p-toluenesulfonic acid monohydrate in pure dioxane, and finally, 0.7 ml. of absolute ethanol. The mixture is stirred for a period of 80 minutes, during which time the steroid trione crystals slowly dissolve; and the reaction is then terminated by addition of 1.7 ml. of pyridine. Solvents are evaporated at 75° C. in a stream of nitrogen, and the damp residue taken up in 50 ml. of warm benzene. Filtration at this point serves to remove insoluble pyridine p-toluenesulfonate, whereupon the filtrate is diluted to a volume of 250 ml. with benzene, 125 ml. of petroleum ether is then added, and the resultant solution is chromatographed on activated alumina, using benzene-petroleum ether, benzene, and finally benzene-ethyl acetate, in that order, as developing agents. The benzene and benzene-ethyl acetate eluates, upon evaporation to dryness, yield white crystalline residues melting in the range 134–145° C. which, upon combination and recrystallization from methyl alcohol, afford pure 3-ethoxy-3,5-androstadiene-11,17-dione, M. P. 145–148° C.

B. *17-α-ethynyl-11-oxotestosterone.*—Acetylene gas is bubbled through a mixture of 2.4 g. of the crude 3-enol ethyl ether (melting range, 134–145° C.) obtained in part A in 150 ml. of benzene and 100 ml. of anhydrous ether, for 30 minutes, whereupon a solution of potassium tert.-amoxide previously prepared from 100 ml. of purified tert.-amyl alcohol and 2.6 g. of potassium metal is added, followed by 75 ml. of anhydrous ether as a rinse, and the reaction allowed to proceed for 3 hours at 25° C., introduction of acetylene gas being continued the while. Flow of acetylene is then shut off, the reaction vessel is swept with nitrogen, and the reactants are then diluted with a mixture of 300 ml. of ether and 200 ml. of benzene. Approximately 500 ml. of a saturated aqueous solution of ammonium chloride is next cautiously added with agitation, whereupon copious evolution of ammonia takes place. Resolution of the resultant two layers is effected and the aqueous phase is extracted again with ether-benzene (150 ml. of each). The ether-benzene extracts are combined and successively washed with two 250-ml. portions of saturated aqueous ammonium chloride, two 250-ml. portions of 5% sodium chloride, and finally one 250-ml. portion of saturated sodium chloride. After drying over sodium sulfate and filtering, the ether-benzene extract is concentrated in vacuo to about 5 ml. of syrup, then taken up in 135 ml. methanol, diluted with 15 ml. of 0.24 normal aqueous hydrochloric acid, and let stand for 24 hours at 20–25° C. A precipitate of rounded, diamond-shaped prisms is formed which, collected and washed with water on a filter, shows M. P. 284–287° C. The mother liquor, upon concentration at 40° C. in a stream of nitrogen to a volume of 60 ml., followed by addition of 5 ml. of methanol, precipitates on standing a second crop of crystals which, collected and washed with water as before, show M. P. 275–280° C. Recrystallization of the product from dioxane and dioxane-ethyl acetate gives material with M. P. 288–291° C., $[\alpha]_D + 100°$ (1% in dioxane).

C. *11-oxo-17α-vinyltestosterone.*—Hydrogen is adsorbed on 1 g. of 5% palladium on calcium carbonate by shaking with a mixture of 25 ml. dioxane and 25 ml. pyridine, under 1 atmosphere pressure. To this catalyst is added a solution of 1 g. of 17α-ethynyl-11-oxotestosterone in 100 ml. of dioxane plus 100 ml. of pyridine, and the whole shaken for 1 hour under 1 atmosphere of hydrogen. The catalyst is then filtered off and the filtrate concentrated in vacuo to a volume of about 75 ml. Approximately 1000 ml. of cold 10% aqueous hydrochloric acid is added and the resultant mixture is extracted twice with 200-ml. portions of ethyl acetate. The ethyl acetate extracts are combined and brought to neutrality by successive washings with 1% aqueous sodium hydroxide, 5% aqueous sodium bicarbonate, and finally, water. The neutral extract is dried over sodium sulfate, filtered, and at last concentrated in vacuo to produce tiny prisms of the desired product, M. P. approximately 160.5° C. The infrared spectrum showed complete obliteration of the ethynyl group absorption peak at 3.0 microns.

EXAMPLE 2

A. *3 - ethoxy-11β-hydroxy-3,5-androstadiene-17-one.*—To 2 g. of 11-β-hydroxyandrostenedione in 10 ml. of purified dioxane is added, in order, 2 ml. of freshly distilled ethyl orthoformate, 0.3 ml. of a 9% dioxane solution of p-toluenesulfonic acid monohydrate, and 0.5 ml. of absolute ethanol. The reaction mixture is stirred 3 hours at 20–25° C., at the end of which time 1.1 ml. of pyridine is added to preclude further reaction. Volatile reagents and solvents are evaporated at 75° C. in a stream of nitrogen, using a partial vacuum. The moist residue is mixed with 200 ml. of warm benzene, whereupon most of the material goes into solution, leaving behind the relatively insoluble pyridine p-toluenesulfonic acid salt. This salt is filtered out and the filtrate diluted to 500 ml. with benzene. Chromatographic purification of the benzene solution on activated alumina, using benzene-ethyl acetate developer as in Example 1A, produces, on evaporation of the eluates, a good yield of the desired 3-ethoxy-11β-hydroxy-3,5-androstadiene-17-one. The material is usable in the next step of the process without further crystallization.

B. *17α-ethynyl - 11β - hydroxytestosterone.*—A 1.67 g. portion of the crystalline 3-enol ether is dissolved in 125 ml. of dry benzene and 100 ml. of anhydrous ether is added thereto. Acetylene gas is bubbled through the stirred solution for half an hour. A solution of potassium tert.-amoxide prepared from 1.8 g. of potassium metal and 75 ml. of tert.-amyl alcohol is then introduced into the reaction mixture, and 25 ml. of anhydrous ether is added as a rinse. Saturation of the reaction mixture with acetylene is maintained thereafter for five hours by continuous bubbling through of the gas, the temperature of the reactants being held in the range of 25–30° C. At the end of this time, the acetylene input is stopped and the reaction vessel is swept out with nitrogen. Approximately 350 ml. of an equi-volume mixture of benzene and ether is added, and 400 ml. of saturated aqueous ammonium chloride is added portionwise with care. Resolution of the two layers thereupon resulting is effected, and the aqueous phase is extracted with a further 200-ml. portion of an equi-volume mixture of benzene and ether. The benzene-ether extracts are combined and washed in turn with (a) two 200-ml. portions of saturated aqueous ammonium chloride, (b) two 200-ml. portions of 5% aqueous sodium chloride, and (c) 200 ml. of saturated aqueous sodium chloride. The benzene-ether solution is then subjected to drying over sodium sulfate, followed by filtration. The filtrate is concentrated in vacuo to a volume of approximately 5 ml., and the residue is then taken up in 10 ml. of 90% aqueous methanol for hydrolysis as in Example 1B. The solution is made 0.025 normal with respect to hydrogen chloride, and the reaction mixture then allowed to stand for 24 hours to complete the hydrolysis. A first crop of crystals is filtered out and combined with the second crop obtained on concentration (in vacuo at 40° C.) of the mother liquor to the point of cloudiness. The crystalline product displays the usual strong ethynyl group absorption at 3.0 microns, a strong hydroxyl peak at 2.78 microns, and a conjugated carbonyl peak at 6.02 microns.

C. *11β-Hydroxy-17α-vinyltestosterone.*—To 1.5 g. of 17α-ethynyl-11β-hydroxytestosterone in 200 ml. of an equi-volume mixture of pyridine and dioxane is added 1.5 g. of 5% palladium on calcium carbonate which has previously been hydrogenated by shaking under one atmosphere of hydrogen in 75 ml. of an equi-volume mixture of pyridine and dioxane, the technique being exactly as in Example 1C. The reduction is allowed to proceed for one hour at one atmosphere of hydrogen pressure, by the end of which time the reaction is complete. Catalyst is filtered off and the filtrate concentrated in vacuo to a volume of about 100 ml. Ten volumes of 10% hydrochloric acid are then added, and the mixture is extracted with 300 ml. of ethyl acetate. A second extraction of the aqueous phase with 300 ml. of ethyl acetate is carried out, the two ethyl acetate extracts are combined, and the solution so obtained is brought to neutrality by successive washings with 175-ml. portions of (a) 1% aqueous sodium hydroxide, (b) 5% aqueous sodium bicarbonate, and (c) water, in that order. The neutral extract is dried over sodium sulfate, filtered, and concentrated in vacuo to yield crystals of the desired 11β-hydroxy-17α-vinyltestosterone, the infrared spectrum of which reveals complete loss of the ethynyl group peak at 3.0 microns, with retention of the hydroxyl and conjugated carbonyl peaks at 2.78 and 6.02 microns, respectively.

I claim:
1. A member of the group consisting of compounds of the formula

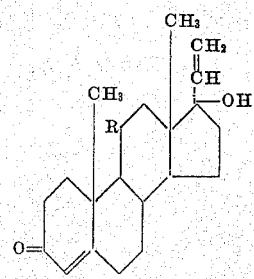

wherein R is a member of the group consisting of oxo and hydroxyl.

2. A compound of the formula

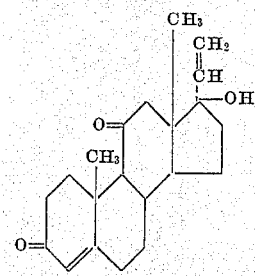

3. A compound of the formula

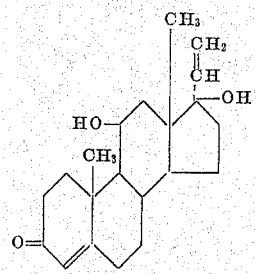

4. In a process for preparing a compound of the formula

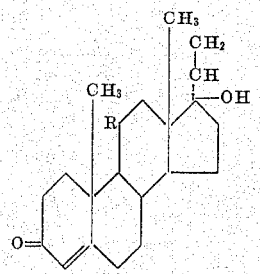

wherein R is a member of the group consisting of oxo and hydroxyl, the steps which comprise condensing a compound of the formula

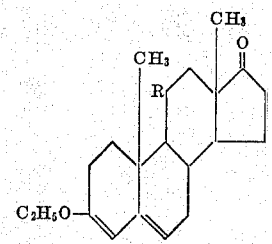

wherein R is a member of the group consisting of oxo and hydroxyl, with acetylene, under the influence of an alkaline condensing agent, and hydrogenating the 17-ethynyl group of the hydrolyzed product of the foregoing condensation to a 17-vinyl group in the presence of a palladium catalyst.

5. In a process for preparing a compound of the formula

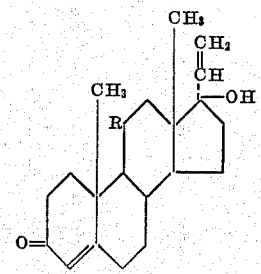

wherein R is a member of the group consisting of oxo and hydroxyl, the steps which comprise condensing a compound of the formula

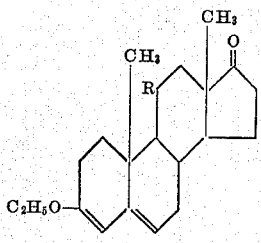

wherein R is a member of the group consisting of oxo and hydroxyl, with acetylene, under the influence of potassium tert.-amoxide, and hydrogenating the 17-ethynyl group of the hydrolyzed product of the foregoing condensation to a 17-vinyl group in the presence of a palladium catalyst.

References Cited in the file of this patent
UNITED STATES PATENTS

| | | |
|---|---|---|
| 2,492,189 | Sarett | Dec. 27, 1949 |
| 2,505,838 | Sarett | May 2, 1950 |